F. W. SCHIPPER.
SHAFT COUPLING.
APPLICATION FILED NOV. 30, 1914.
1,183,681.
Patented May 16, 1916.
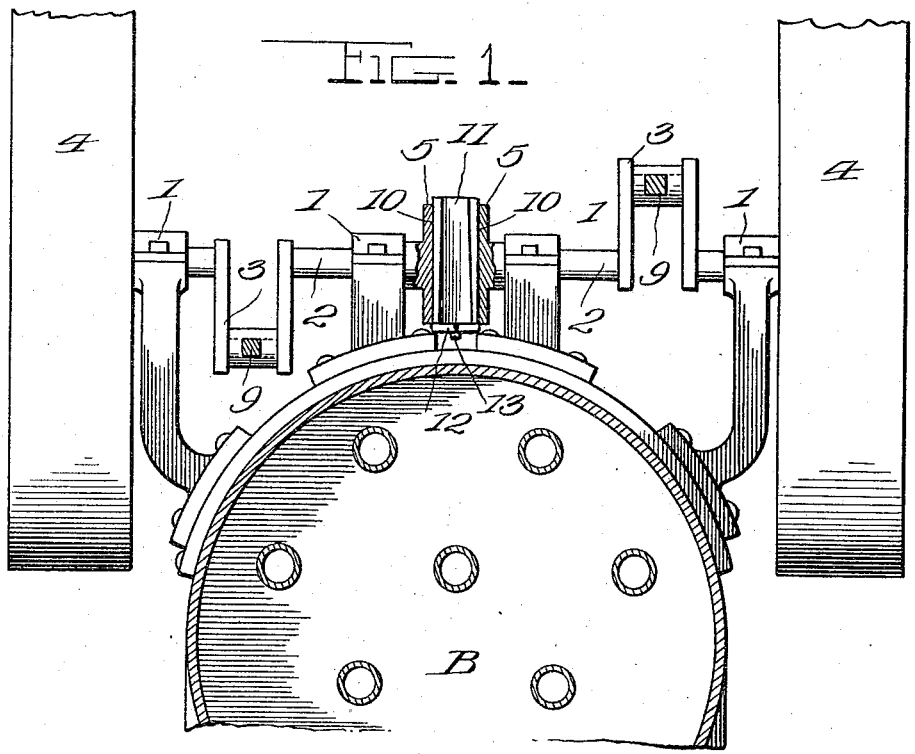
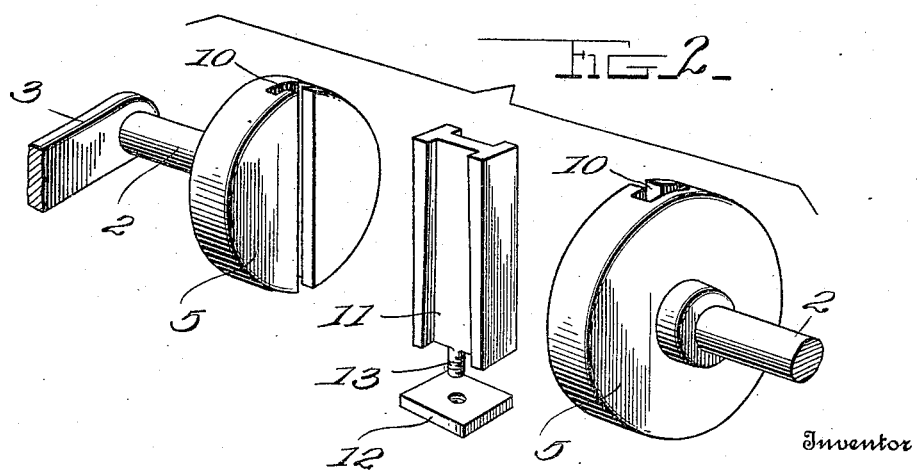
Witnesses
J. R. Pierce
C. Munter
Inventor
F. W. Schipper.
By H. B. Willson & Co.
Attorneys

UNITED STATES PATENT OFFICE.

FREDERICK W. SCHIPPER, OF VILLISCA, IOWA.

SHAFT-COUPLING.

1,183,681.  Specification of Letters Patent.  Patented May 16, 1916.

Application filed November 30, 1914. Serial No. 874,800.

*To all whom it may concern:*

Be it known that I, FREDERICK W. SCHIPPER, a citizen of the United States, residing at Villisca, in the county of Montgomery and State of Iowa, have invented certain new and useful Improvements in Shaft-Couplings; and I do declare the following to be a full, clear, and exact description of the invention, such as will enable others skilled in the art to which it appertains to make and use the same.

This invention relates to improvements in shaft couplings and has for one of its objects the provision of a device by which shafts or portions of shaftings or rods may be more compactly and securely held together than heretofore.

Another object of the invention is to provide a device which will be simple, strong, durable, inexpensive to manufacture, easy to apply, efficient, reliable and well adapted to the purposes for which it is designed.

With these and other objects in view, the invention consists of certain novel features of construction and the combination and arrangement of parts as will be hereinafter fully described and claimed.

In the accompanying drawings in which similar reference numerals designate like parts throughout the several views—Figure 1 is a transverse sectional view of a traction engine boiler having alined shafts mounted thereon and showing a device constructed in accordance with this invention coupling the ends of such shafts together; and Fig. 2 is a disassembled perspective view of the portions of the two shafts with the improved means for locking them together.

In these drawings constituting a part of this application, a traction engine wheel supported boiler B is shown from whose upper side a plurality of transversely alined bearings 1 rise, two pairs of said bearings being here shown. Revolubly mounted in the two pairs of bearings 1 is a pair of alined shafts 2, each of which is equipped with a crank 3 at substantially its center, with a fly wheel 4 at its outer end, and with a circular head 5 at its inner end, these heads being spaced one from the other only a slight distance as seen in Fig. 1 of the drawings. These cranks 3 are connected to connecting rods 9 which are in turn operated by independent engines, not shown, whereby the shafts 2 may be operated independently of each other and at different speeds. For this purpose, in order that the two shafts 2 may be locked together to operate as a single unit, the contiguous flat faces of the two heads 5 are provided with diametrically extending T-shaped grooves 10 which are of greater depth at one end than at the other end, as clearly seen in Fig. 1. Adapted for insertion into the two grooves 10 is a key 11 which is I-shaped in cross section, whereby two longitudinal T-shaped sides are provided, these two sides being inserted into the two grooves 10 and being of less thickness at one end than at the other, whereby they may wedge into said T-shaped grooves in such a manner as to draw the two heads 5 toward each other. When the parts stand in this position, a nut 12 is threaded on a stud 13 which projects longitudinally from the thinnest end of the key 11. By this provision the key is readily held against dislocation.

From the foregoing description taken in nection with the accompanying darwings, it will be seen that a very simple device has been provided for carrying out the objects of the invention, yet that the efficiency thereof will not be impaired by such simplicity.

It is also apparent that the invention may be easily applied or removed from use, which makes it indispensable when it is desired that the traction engine operate the feeding mechanism of a threshing machine independent of the separating mechanism.

I claim:

A shaft coupling comprising a pair of alined shafts having slightly spaced heads on the ends thereof, said heads being provided with diametrically extending T-shaped grooves in their contiguous flat faces, said grooves being of greater depth at one end than at the other, a key I-shaped in cross section having two longitudina T-shaped sides inserted in said grooves an being of greater thickness at one end than at the other to draw said heads together, a threaded stud projecting longitudinally from the thinnest end of said key, and a nut disposed on said stud to prevent dislocation of said key.

In testimony whereof I have hereunto set my hand in presence of two subscribing witnesses.

FREDERICK W. SCHIPPER.

Witnesses:
G. B. CARROLL,
S. H. COLEMAN.